United States Patent [19]

Goto

[11] Patent Number: 4,939,772
[45] Date of Patent: Jul. 3, 1990

[54] SWITCHING CONTROL APPARATUS FOR A COMMUNICATION TERMINAL HAVING A VOICE TERMINAL DEVICE AND A NON-VOICE TERMINAL DEVICE

[75] Inventor: Tadashi Goto, Nagoya, Japan
[73] Assignee: Let's Corporation, Nagoya, Japan
[21] Appl. No.: 335,446
[22] Filed: Apr. 10, 1989
[30] Foreign Application Priority Data
  Apr. 12, 1988 [JP] Japan .................................. 63-89552
[51] Int. Cl.⁵ ...................... H04M 11/00; H04M 1/64
[52] U.S. Cl. ...................................... 379/96; 379/100; 379/102; 379/104; 379/67; 379/74; 379/80
[58] Field of Search ............... 379/100, 102, 104, 105, 379/95–98, 67, 80, 74, 70, 79, 82

[56] References Cited

U.S. PATENT DOCUMENTS

| | | | |
|---|---|---|---|
| 3,541,261 | 11/1968 | Okleshen et al. .................... | 379/100 |
| 3,723,656 | 3/1973 | Curtis et al. ........................... | 379/82 |
| 3,873,772 | 3/1975 | Dumler .................................. | 379/80 |
| 4,201,896 | 5/1980 | Bower et al. ......................... | 379/67 |
| 4,340,783 | 7/1982 | Sugiyama et al. .................. | 379/100 |
| 4,821,312 | 4/1989 | Horton et al. ....................... | 379/102 |

FOREIGN PATENT DOCUMENTS

| | | | |
|---|---|---|---|
| 0148268 | 8/1985 | Japan ................................... | 379/100 |
| 0259058 | 12/1985 | Japan ................................... | 379/100 |
| 0082156 | 4/1988 | Japan ................................... | 379/100 |
| 0148750 | 6/1988 | Japan ................................... | 379/100 |
| 87/07802 | 12/1987 | PCT Int'l Appl. ................. | 379/100 |

Primary Examiner—Jin F. Ng
Assistant Examiner—Wing F. Chan
Attorney, Agent, or Firm—Hidaka and Johansen

[57] ABSTRACT

A terminal switching control apparatus, used for a combination of a voice terminal device and a non-voice terminal device, comprises a call signal recognition detector to detect an incoming signal and distinguish the detected signal between an voice signal and an non-voice terminal call signal, a device for transmitting a response message to urge the calling party to respond if no incoming voice signal is detected, an action request device for urging the called party to respond by the voice terminal device when an incoming voice signal is recognized after transmitting the response message, a control device for switching the line connection to the non-voice terminal device if neither the voice signal nor the non-voice signal is detected by the call recognition device, and a set of mode selector switches for selecting a presence mode and an absence mode according to the presence/absence status of the called party. The presence/absence mode can also be controlled automatically to conform to the presence/absence status of the called party.

6 Claims, 1 Drawing Sheet

SWITCHING CONTROL APPARATUS FOR A COMMUNICATION TERMINAL HAVING A VOICE TERMINAL DEVICE AND A NON-VOICE TERMINAL DEVICE

BACKGROUND OF THE INVENTION

1. Field of the invention

The present invention relates to a terminal switching control apparatus for a communication terminal having a voice terminal device and a non-voice terminal device which exercises a switching control between the voice terminal device and the non-voice terminal device.

2. Description of the Prior Art

A system combining a voice terminal device and a non-voice terminal device, such as a combination of a telephone set and a facsimile tranceiver, has come into wide use in a telephone communication system, where the voice terminal device and the non-voice terminal device share a common telephone line. In case the voice terminal device is a telephone set and the non-voice terminal device is a facsimile tranceiver, the facsimile tranceiver is normally given a priority in such a manner that the telephone system is automatically connected to the facsimile device when the telephone bell rings upon arrival of a call signal. Then, the calling party tends to be confused and frustrated hearing over the phone only the automatic facsimile answer back tone while no voice contact is established with the called party. On the other hand, the called party also has inconvenience in that no voice call can be received when the facsimile device is set for the automatic reception mode.

The U.S. Pat. No. 4,584,434, issued Apr. 22, 1986 to Hashimoto, teaches a system added to a communication terminal which enables a facsimile device to receive information in response to a remote control signal transmitted from the calling side when no person is present at the called side. However, such a conventional remote controlled switching system requires a transmission of a predetermined push-button code signal from the calling side in order to activate the switching to the facsimile device at the called side. Therefore, in such a system, if the calling party does not know the particular code, the connection to the facsimile device at the called side will not be achieved and the information will not be transmitted to the called side.

The applicant's international application, No. PCT/JP86/00404, laid open to the public Dec. 17, 1987, discloses a terminal controller which automatically switches a connection between a telephone set and a facsimile device without using any particular code transmitted from the calling side.

SUMMARY OF THE INVENTION

In view of the above situation, it has been a need in the industry to provide a phone/facsimile terminal controller which enables an incoming call to be switched to the facsimile, when necessary, for any non-discriminating calling parties.

It is an object of the present invention to provide a terminal switching control apparatus for a phone/facsimile terminal which enables the calling party to perform a voice phone call or a facsimile message transmission easily without confusion.

It is another object of the present invention to provide a terminal switching control apparatus by which the called party can receive a voice phone call when a phone call bell rings and can still receive information to the facsimile device when a facsimile transmission is directed to the terminal of the called party.

It is a further object of the present invention to provide a terminal switching control apparatus for a phone/facsimile terminal which enables the user of the terminal to transmit or receive messages in an optimum manner, whether the user is present or absent, so that the terminal can be efficiently utilized.

The terminal switching control apparatus of the present invention is intended to operate in a terminal apparatus which is equipped with a voice terminal device and a non-voice terminal device connected to a communication circuit and is designed to maintain the connection with the circuit after an incoming call has been received to the terminal apparatus and properly perform a switching of the connection either to the voice terminal or to the non-voice terminal. In order to achieve the objects mentioned above, the terminal switching control apparatus of the present invention comprises a call signal recognition detector to detect and recognize a voice signal and a non-voice terminal device call signal, a response message transmitting device for transmitting a response message to the calling side to urge the calling party to respond if no incoming voice signal is detected within a predetermined time after the call is received and the connection with the communication circuit is established, an action request device for urging the called party to make a voice response by the voice terminal device when an incoming voice signal is recognized after the response message is transmitted, and a switching control device which switches the line connection to the non-voice terminal device if neither a voice signal nor a non-voice terminal call signal is detected after the transmission of the response message.

The terminal switching control apparatus of the present invention further comprises a mode selecting device by which the apparatus can selectively be set to a presence mode or to an absence mode according to the presence or the absence, respectively, of the called party. Furthermore, the mode selecting device is constructed so that the mode setting is automatically changed to the absence mode if, under the presence mode, no response is made by the voice terminal device and the communication is cut off as the caller hangs up the phone; and the mode setting is automatically changed to the presence mode if, under the absence mode, a voice response is made (the called party has unhooked the handset) by the voice terminal device.

DETAILED DESCRIPTION OF THE PREFERRED EMBODIMENTS

Figure 1:
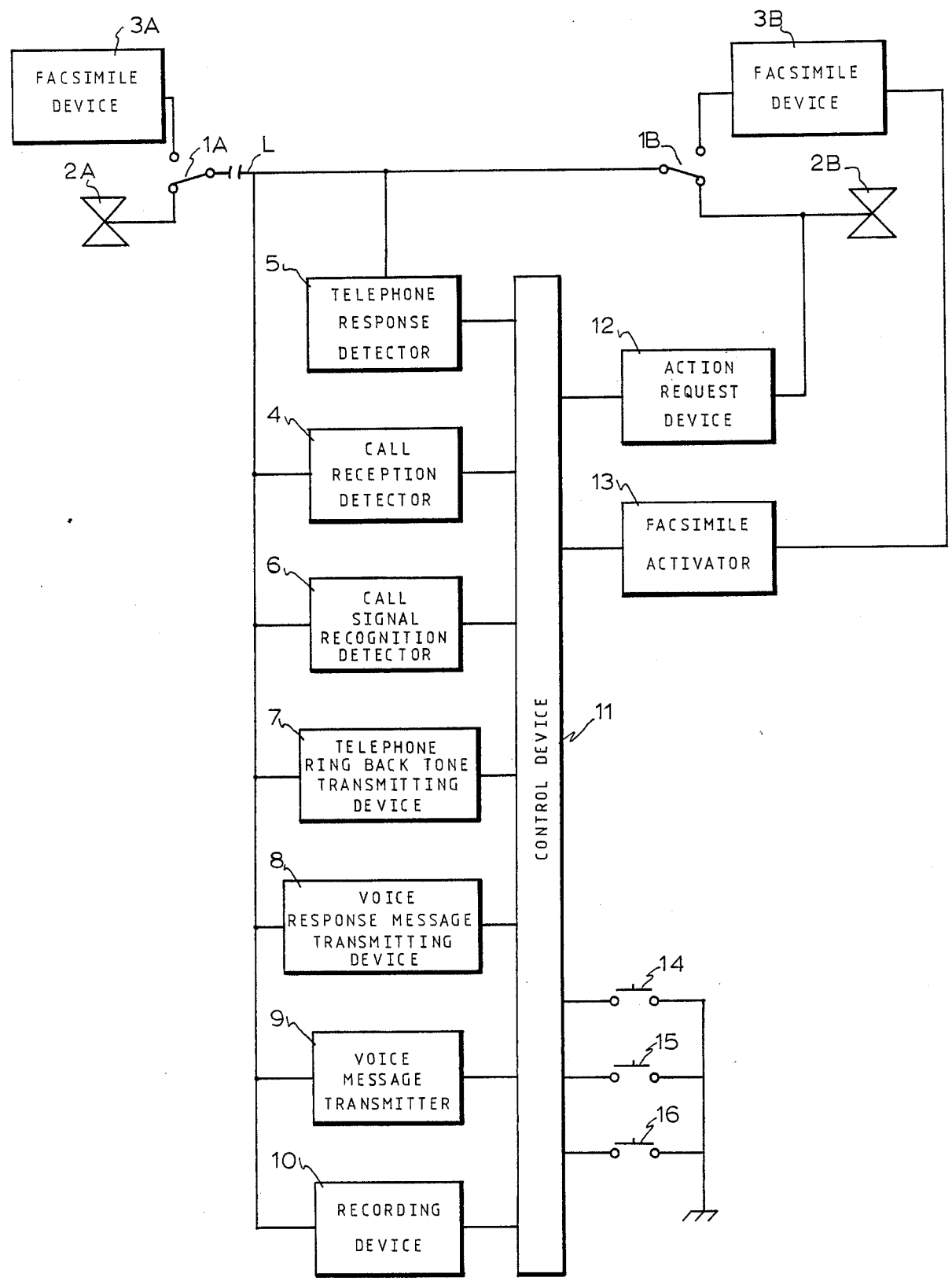
FIG. 1 is a block diagram of one embodiment of the present invention.

In reference to FIG. 1, one embodiment of the present invention will be hereunder described in detail. This embodiment applies to a communication terminal which includes a telephone as a voice terminal device and a facsimile device as a non-voice terminal device.

In FIG. 1, letter L denotes a communication circuit. At the calling side, the communication circuit L is connected with a telephone 2A or a facsimile device 3A through an intermediary switching relay 1A. At the called side, the communication circuit L is connected with a telephone 2B or a facsimile device 3B through an intermediary switching relay 1B. Although FIG. 1 shows the arrangement wherein the relays 1A and 1B are in the positions so as to be normally connected to the telephones 2A and 2B, respectively, the relays 1A and 1B can also be constructed so as to be normally connected to the facsimile devices 3A and 3B, respectively, and the connection is automatically switched to the telephone 2A or telephone 2B when the handset of the telephone 2A or 2B, respectively, is unhooked (the handset in the off-the-hook position or an equivalent push-button operation). Numeral 4 denotes a call reception detector which detects a telephone call signal (in Japan, normally 16 Hz, 75V, 1 sec-ON/2 sec-OFF) coming through the communication circuit L. When the call signal is detected by the call reception detector 4, the loop of the circuit L is closed (namely, the telephones 2A and 2B are connected to each other through the circuit L) and the connection with the circuit L is maintained. Numeral 5 denotes a telephone response detector which detects a response of the telephone 2B when a response is made by the telephone 2B, or the handset of the telephone 2B is unhooked (or an equivalent push-button action is made) by the called party.

Numeral 6 denotes a call signal recognition detector which detects a facsimile call signal [1100 Hz CNG signal, 1300 Hz (a special signal used by NTT, Japan) non-ringing facsimile call signal, or the like] or a voice signal which comes from the calling side and distinguishes the detected signal between a facsimile call signal and a voice signal.

The call signal recognition detector 6 counts ON-time (or OFF-time) of the incoming signal within a specified frequency range within a predetermined unit time period immediately after detecting the incoming signal, and determines the signal to be a facsimile call signal if the counted ON-time is less than a specified percentage against the predetermined unit time period, and determines the signal to be a voice signal if the counted ON-time is greater than the same specified percentage of the same predetermined unit time period.

Specifically, in the present embodiment, ON-time counting (or, complementarily, OFF-time counting) of the incoming signal within the frequency range of 300 to 3400 Hz is performed; the unit time period is 3.0 seconds immediately after detecting the incoming signal; and the reference time periods for ON-time or OFF-time are 0.7 second (23.33%) or 2.3 seconds (76.67%), respectively, out of the 3.0 second unit time period. More specifically, if the incoming signal is detected for a time period less than 0.7 second out of the 3.0 second unit time period, the signal is determined to be a facsimile call signal, and if the incoming signal is detected for a time period greater than 0.7 second out of the 3.0 second unit time period, the signal is determined to be a voice signal.

As a matter of course, the time counting can be conversely made for the OFF-time instead of the ON-time. In that case, if the incoming signal is absent for a time period greater than 2.3 seconds out of the 3.0 second unit time period, the signal is determined to be a facsimile call signal, and if the incoming signal is absent for a time period less than 2.3 seconds out of the 3.0 second unit time period, the signal is determined to be a voice signal.

It is assumed that a voice signal should always last for more than 0.7 second. On the other hand, the 1100 Hz CNG signal is a repetitive 0.5 sec-ON/3.0 sec-OFF signal. This signal can not be ON for more than 0.7 second out of a 3.0 second time period even a tolerance is taken into consideration. Therefor, this signal is recognized by the call signal recognition detector 6 as a facsimile call signal when detected.

Upon recognizing a facsimile call signal or voice signal, the detector 6 transmits a facsimile call signal detection signal or voice signal detection signal, respectively, to a control device which will be described later. The call signal recognition detector 6 comprises a preset counter for setting the unit or reference time periods described above.

Numeral 7 denotes a telephone ring back tone transmitting device which transmits a telephone ring back tone to the calling side. Numeral 8 denotes a voice response message transmitting device which transmits a response message (such as "Please talk") to the calling side to urge the caller to respond when a voice signal is not detected by the call signal recognition detector 6 within a predetermined time after the reception of the call. The response message transmitting device 8 includes a masked ROM in the present embodiment. Numeral 9 denotes a voice message transmitter which transmits prerecorded voice message from the called side to the calling side. The voice message transmitter 9 includes a read/write memory which is an ordinary RAM in the present embodiment. Numeral 10 denotes a recording device to record a voice message sent from the calling side. Numeral 11 denotes a control device which conducts various control operations for switching the connection of the communication circuit L to the telephone 2B or to the facsimile device 3B. The control device 11 includes a microprocessor as its controller. Numeral 12 denotes an action request device which urges the called party to respond by the telephone 2B by an audible sound (such as a bell or a tone ringer) or by a visible display. Numeral 13 denotes a facsimile activator which activates the facsimile device 3B. The facsimile activator 13 includes an oscillator which transmits facsimile activating signal which is a telephone call frequency signal (16 Hz in Japan) or non-ringing facsimile call frequency signal. Either of the two signals can be selected by a switching operation.

Numerals 14, 15 and 16 denote push-button type mode selector switches by which presence mode, automatic mode, or absence mode, respectively, can be selected according to the presence/absence status of the call receiving party. The mode selector switch 14 is for the presence mode, which is to be set to its ON position when the call receiving party is available for receiving a call. The mode selector switch 15 is for the automatic mode, which is to be set to its ON position when the automatic mode is desired. The mode selector switch 16 is for the absence mode, which is to be set to its ON position while the call receiving party is not available or the absence mode is otherwise desired. The mode selector switches 14, 15 and 16 are designed so that when one of the mode selector switches 14, 15, or 16 is set to its ON position, the other two switches are automatically set to their OFF positions.

The operation of the above described embodiment will now be explained in reference to FIG. 1. When the mode selector switch 14 is set for the presence mode, and an incoming telephone call signal from the communication circuit L is detected by the call reception detector 4, the loop of the communication circuit L is closed and the connection with the communication circuit L will be maintained. Then the action request device 12 is driven by the control device 11, causing the bell of the telephone 2B to ring so as to urge the called party to respond. If the called party unhooks the handset of the telephone 2B (or makes an equivalent push-button operation) within a predetermined time (or a number of bell rings) after the reception of the call signal, the telephone response detector 5 detects the response of the called party and transmits a signal to the control device 11, causing the action request device 12 to be deactivated. Thus, a voice communication between the calling party and the called party is established subsequent to the telephone call by the calling party.

In case a 1100 Hz CNG facsimile call signal is transmitted from the facsimile device 3A of the calling side to the called side, the call signal recognition detector 6 detects the incoming facsimile call signal and recognizes it as a facsimile call signal in the manner described in detail before. When the called party hears the tone of the facsimile call signal and puts the handset back on the hook, the relay 1B is switched to the side for the connection to the facsimile device 3B (up side, as viewed in FIG. 1) in response to a command from the control device 11 and the oscillator of the facsimile activator 13 is triggered, then the facsimile device 3B is activated. Thereafter, each phase of the conventional facsimile communication procedures is executed and the facsimile communication is performed.

In case a "silent" facsimile device (by which no facsimile call signal is transmitted) is used on the calling side or the called party has to manually set the connection to the facsimile device at a verbal request of the calling party, the called party dials its telephone (or pushes the buttons) for a predetermined number in order to generate a dial-pulse signal (or push-button pulse signal). Then, the generated signal causes the intermediary switching relay 1B to be switched over to the side for the connection to the facsimile device 3B and the facsimile device 3B is activated, and the facsimile reception is enabled in the same manner as in the case described above. If, under the presence mode, no response is made by the telephone 2B after the call bell has sounded for a predetermined period of time (or a predetermined number of bell ring) and, consequently, the communication circuit L is disconnected (the calling party hangs up the phone), the mode setting is automatically switched from the presence mode to the absence mode which will be explained later. Therefore, in case the party on the called side has failed to set the mode setting to the absence mode before he leaves the site of the terminal, he can later change the mode setting from the presence mode to the absence mode by making a phone call to the telephone 2B from any place away from the terminal site and by letting the telephone 2B re-ring for more than the predetermined time period and then simply hanging up the phone.

Next, in case the mode selector switch 15 is set for the automatic mode, the bell of the telephone 2B will not sound for a predetermined time period after the telephone 2B is called, while its connection with the communication circuit L is maintained. During this period, however, the ring back tone is kept transmitted back to the calling side because the telephone ring back tone transmitting device 7 is enabled by a command sent from the control device 11. When the calling party makes a telephone call, the connection with the circuit L is established, and a voice signal from the calling party is detected by the call signal recognition detector 6, a voice signal detection signal is transmitted from the detector 6 to the control device 11, then the control device 11 transmits a command to the action request device 12, which in turn causes the telephone 2B to ring the bell to urge the called party to respond. Upon the called party unhooks the handset (or performs an equivalent push-button operation) of the telephone 2B in response to the bell ring, the control device 11 transmits a stop command to the telephone ring back tone transmitting device 7, then the device 7 ceases transmitting the ring back tone to the calling side, and thus a voice communication between the calling party and the called party is established.

On the other hand, when the calling party makes a telephone call and the connection with the circuit L is established, and a voice signal is not detected by the call signal recognition detector 6, the control device 11 transmits a command to the response message transmitting device 8 so that the device 8 is activated to transmit a voice response message to the calling side urging the calling party to make a voice response. When a voice signal arrives at the called side after the voice response message is transmitted to the calling side and the call signal recognition detector 6 detects and recognizes the voice signal, its voice signal detection signal is input to the control device 11, in the same manner as described above, and the control device 11 transmits a command to the action request device 12 so that the device 12 is activated, which in turn causes the telephone 2B to ring the bell to urge the called party to respond. Then, as the called party unhooks the handset of the telephone 2B (or makes an equivalent push-button operation) in response to the ring of the bell, the voice communication between the calling party and the called party is established. While the bell is ringing at the called side, in this event, the response message transmitting device 8 keeps transmitting a response message to the calling side to inform the calling party that the called party is being called at the called side.

On the other hand, in case the called party makes no response by the telephone 2B within a predetermined time period (or a predetermined number of bell rings) after the arrival of the call, the control device 11 transmits a command to the voice message transmitter 9 to activate the transmitter 9 so that the transmitter 9 transmits a prerecorded voice message to the calling side.

In case the facsimile device 3A of the calling side is of an automatic call signal transmission type, the reception by the facsimile device 3B at the called side is performed in the same manner as in the case of the aforementioned presence mode. In case the facsimile device 3A of the calling side is of a type which does not transmit a facsimile call signal, no signal will be detected by the call signal recognition detector 6 even after a response message is transmitted to the calling side. Then, in this case, the control device 11 causes the intermediary switching relay 1B to be switched to the side for the connection with the facsimile device 3B; at the same time, facsimile device 3B is activated by the facsimile activator 13 and the facsimile reception is enabled.

In case the facsimile device 3A of the calling side is of a manual type with which the called party is required to manually switch the connection to the facsimile device, and a response is made by the called party, the facsimile reception is enabled in the same manner as in the above described presence mode case by performing the switching operation by dial or push-button on the telephone 2B by the called party. If, in this case, no response is made by the telephone 2B and a message is transmitted to the calling side by the voice message transmitter 9, upon completion of the transmission of the message, control device 11 transmits a command which causes the intermediary switching relay 1B to switch to the side for the connection with the facsimile device 3B and the facsimile reception is enabled.

In case the mode selector switch 16 is set for the absence mode, the voice message transmitter 9 is activated immediately after the connection with the communication circuit L is maintained and the prerecorded message is transmitted to the calling side; at the same time, the recording device 10 is activated to start recording any message which may be sent from the calling side. As the transmission and the reception of the messages are completed, the control device 11 transmits a command which causes the switching relay 1B to switch to the side for the connection with the facsimile device 3B; then, thereafter, the facsimile reception is enabled in the same manner as in the case of the above described automatic mode.

A design may be made, as a matter of course, so that the voice message transmitter 9 stops its operation immediately and the switching relay 1B is switched to the facsimile device 3B side as soon as a facsimile device call signal is detected and recognized by the call signal recognition detector 6. In this case of the absence mode, if the handset of the telephone 2B is unhooked (or an equivalent push-button operation is made) for a response operation, the absence mode is automatically changed to the presence mode.

When the transmission and reception of a series of messages, as described above, are completed, the switching relay 1B reverts to the original position for the connection with the telephone 2B and the terminal stands by for a reception of a subsequent new call.

The application of the present invention is not limited to the above described embodiment. Additional modes of embodiment may be implemented within the scope of the present invention. For instance, the apparatus of the present invention may include a person detecting device employing an infrared sensor or a voice detector in order to automatically determine the presence or absence of the called party so that the action request device 12 is activated when a telephone call is received and the called party is determined to be present.

The effect of the present invention will now be described. The switching control apparatus of the present invention, as described above, enables the calling party to conduct voice communication or facsimile transmission without fail and without any confusion. On the other hand, the same apparatus enables the called party to make a telephone response immediately when the bell of the telephone, as a voice terminal, rings. In case a facsimile call is received by the facsimile device, as a non-voice terminal, the apparatus will smoothly conduct a switching control according to the type and feature of the calling facsimile device. Furthermore, according to the status of the called party, e.g. his presence or absence, the apparatus will select an optimum communication sequence for message exchange with the calling side. Thus, the switching control apparatus of the present invention enhances a total utilization efficiency for a combination of a voice terminal device and a non-voice terminal device which are connected to a common communication circuit.

What is claimed is:

1. A switching control apparatus for a communication terminal, connected to a communication circuit, having a voice terminal device and a non-voice terminal device, which maintains a connection with said communication circuit upon reception of a calling signal by said communication terminal, wherein said apparatus comprises:
    (a) means for switching the connection with said communication circuit between said voice terminal device and said non-voice terminal device; and
    (b) a call signal recognition detector which detects an incoming signal and distinguishes the incoming signal between a voice signal and a non-voice terminal call signal, said call signal recognition detector counting an ON-time of the incoming signal within a specified frequency range within a predetermined unit time period immediately after detecting the incoming signal, determining the incoming signal to be a non-voice terminal call signal if the counted ON-time is less than a specified time duration percentage against the predetermined unit time period, and determining the incoming signal to be a voice signal if the counted ON-time is greater than said specified time duration percentage against the predetermined unit time period.

2. A switching control apparatus according to claim 1, wherein said incoming signal is within the frequency range of 300 to 3400 Hz, said predetermined unit time period is 3.0 seconds, and said specified time duration percentage against the predetermined unit time period is 23.3%.

3. A switching control apparatus for a communication terminal, connected to a communication circuit, having a voice terminal device and a non-voice terminal device, which maintains a connection with said communication circuit upon reception of a calling signal by said communication terminal, wherein said apparatus comprises:
    (a) means for for switching the connection with said communication circuit between said voice terminal device and said non-voice terminal device; and
    (b) a call signal recognition detector which detects an incoming signal and distinguishes the incoming signal between a voice signal and a non-voice terminal call signal, said call signal counting an OFF-time of the incoming signal within a specified frequency range within a predetermined unit time period immediately after detecting the incoming signal, determining the incoming signal to be a non-voice terminal call signal if the counted OFF-time is greater than a specified time duration percentage of the predetermined unit time period, and determining the incoming signal to be a voice signal if the counted OFF-time is less than said specified time duration percentage against the predetermined unit time period.

4. A switching control apparatus according to claim 3, wherein said incoming signal is within the frequency range of 300 to 3400 Hz, said predetermined unit time period if 3.0 seconds, and said specified time duration percentage against the predetermined unit time period is 76.7%.

5. A switching control apparatus for a communication terminal, connected to a communication circuit, having a voice terminal device and a non-voice terminal device, which maintains a connection with said communication circuit upon reception of a calling signal by said communication terminal, wherein said apparatus comprises:

(a) means for switching the connection with said communication circuit between said voice terminal device and said non-voice terminal device;

(b) a call signal recognition detector which detects an incoming signal and distinguishes the incoming signal between a voice signal and a non-voice terminal call signal;

(c) means for transmitting a voice response message to a calling party if no voice signal is detected by said call signal recognition detector within a predetermined time period immediately after the connection with said communication circuit is maintained;

(d) means for urging a called party to respond by said voice terminal device when a voice signal is recognized after transmitting the voice response message; and (e) a control device which switches the connection of said communication circuit to said non-voice terminal device if neither the voice signal nor the non-voice signal is detected by said call signal recognition detector after the voice response message is transmitted;

wherein said call signal recognition detector counts an ON-time of the incoming signal within a specified frequency range within a predetermined unit time period immediately after detecting the incoming signal, and determines the incoming signal to be a non-voice terminal call signal if the counted ON-time is less than a specified time duration percentage against the predetermined unit time period, and determines the incoming signal to be a voice signal if the counted ON-time is greater than said specified time duration percentage against the predetermined unit time period.

6. A switching control apparatus for a communication terminal, connected to a communication circuit, having a voice terminal device and a non-voice terminal device, which maintains a connection with said communication circuit upon reception of a calling signal by said communication terminal, wherein said apparatus comprises:

(a) means for switching the connection with said communication circuit between said voice terminal device and said non-voice terminal device;

(b) a call signal recognition detector which detects an incoming signal and distinguishes the incoming signal between a voice signal and a non-voice terminal call signal;

(c) means for transmitting a voice response message to a calling party if no voice signal is detected by said call signal recognition detector within a predetermined time period immediately after the connection with said communication circuit is maintained;

(d) means for urging a called party to respond by said voice terminal device when a voice signal is recognized after transmitting the voice response message; and (e) a control device which switches the connection of said communication circuit to said non-voice terminal device if neither the voice signal nor the non-voice signal is detected by said call signal recognition detector after the voice response message is transmitted;

wherein said call signal recognition detector counts an OFF-time of the incoming signal within a specified frequency range within a predetermined unit time period immediately after detecting the incoming signal, and determines the incoming signal to be a non-voice terminal call signal if the counted OFF-time is greater than a specified time duration percentage against the predetermined unit time period, and determines the incoming signal to be a voice signal if the counted OFF-time is less than said specified time duration percentage against the predetermined unit time period.

* * * * *